Oct. 12, 1926.                                    1,603,110
               A. HORTEN
            FIELD WATERING PLANT
            Filed Oct. 12. 1925
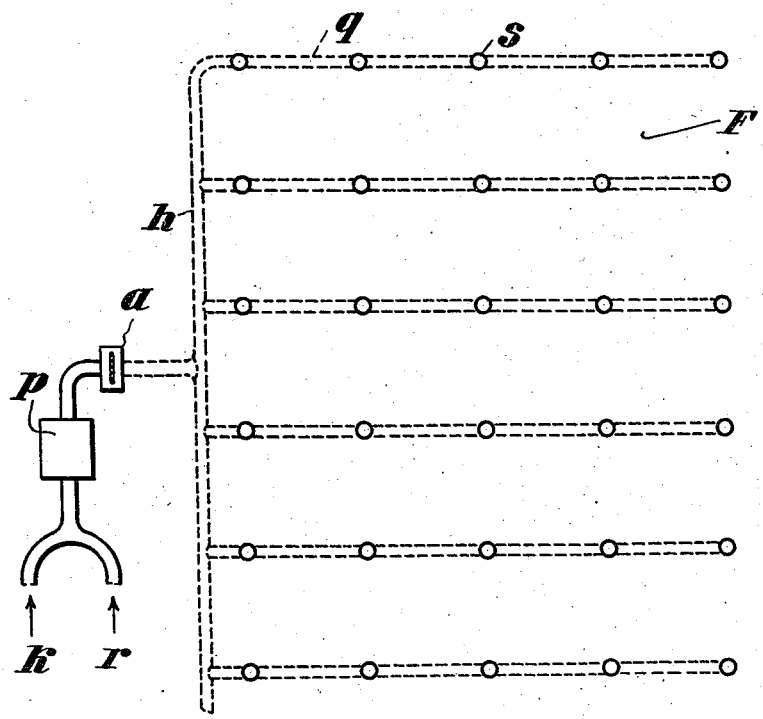
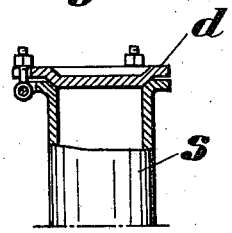

Patented Oct. 12, 1926.

1,603,110

UNITED STATES PATENT OFFICE.

ALPHONS HORTEN, OF BERLIN-WILMERSDORF, GERMANY.

FIELD-WATERING PLANT.

Application filed October 12, 1925, Serial No. 62,070, and in Germany July 1, 1924.

This invention relates to field-watering plants comprising a subterranean pipe system into which the water is forced and from which the water is taken through tapping pipes connected to the said system and distributed over the field to be watered. The invention relates more particularly to field-watering plants of this kind in which the water is supplied to the subterranean pipe system at a comparatively high pressure, that is a pressure of several atmospheres.

In pipe systems or networks of this kind it is highly important that all danger of water hammers or sudden rises of pressure are obviated in the periodic spouting of water from the pipe system. For economical reasons it is also extremely important to enable the tapping pipes through which the water is taken from the subterranean network to be closed by cheap and simple closing devices.

These objects are accomplished by the present invention by providing a valve that is adapted to be closed at all pressures at only one point in the pipe system, viz, between the subterranean distributing pipe system and the pump that forces water into the same while all the tapping pipes distributed over the field are closed by single covers of any known or suitable kind which can only be closed when there is no pressure in the subterranean network, i. e. when the pump is cut off from the said pipe system by the said valve.

The invention is diagrammatically illustrated in the drawing in which—

Fig. 1 shows the general arrangement or lay-out of the pipe system connected to the pump and Fig. 2 is a side view, partly in section, of one of the tapping pipes distributed over the field.

In the field to be watered a system of pipes is buried which may consist of a main pipe $h$ and branch pipes $q$ extending at right angles from the main pipe and placed about 100 yards apart from each other. At points spaced about 100 yards apart each branch pipe $q$ is provided with vertical tapping pipes $s$ that extend above the surface of the ground. The water or liquid to be sprinkled over the field is forced into the main pipe $h$ and the branch pipes $q$ by a pump $p$ which takes clear water from a pipe $k$ and sewerage water or liquid manure or the like from a pipe $r$ alternately. Arranged between the pump $p$ and the subterranean pipe system is a single valve $a$ capable of being closed or opened while the water in the pipes is at a high pressure. In the whole of the pipe system beyond the valve $a$ there are however no pipe-closing members that can be operated while the water is under pressure and only covers $d$ are provided on the tapping pipes $s$ which can only be closed when the water is not under pressure, i. e. when the pump $p$ is cut off from the subterranean pipe network by the valve $a$. Of course it might be possible to place the covers $d$ or other removal closure means in position while the water was issuing under fairly high pressure from the pipes $s$, but it would require special apparatus to do this and would result in the thorough wetting of the operator so that for all practical purposes it is true that in applicant's system the closure means cannot be employed to stop the flow of liquid through the pipes except after this flow has first been cut off at the valve $a$.

The covers $d$ per se are well known and the invention consists only in arranging the system so that not a single valve that can be closed while the water is under pressure needs to be provided beyond the valve $a$ which is opened to connect the pipe system to the pump when the latter is operating.

By providing closing members in the form of covers $d$ on the tapping pipes $s$ the operators using the field-watering plant are obliged to proceed in the following manner:

The sprinkler or water-throwing device which may consist of a water-ejecting nozzle rotated about a vertical axis by a motor and only one of which is provided for the entire network, is connected to one of the numerous tapping pipes $s$ whilst the valve $a$ is closed so as to cut all pressure off the pipe system $h$, $q$. The cover $d$ of a tapping pipe is removed and the squirting device or sprinkler is connected to the tapping pipe $s$ in place of the cover $d$. The operator at the sprinkler or squirting device then gives a signal, as a radio signal, to the operator at the pump and the latter then opens the valve $a$ or, if the pump is not kept continuously operating, he starts up the pump $p$. Water is then squirted through the tapping pipe $s$ used over the field. When the squirt operator desires to stop squirting he again gives a signal and the pump operator closes the valve a or stops the pump. Pressure is thus cut off from the subterranean pipe system and all danger of sudden excessive pressure in the pipe system is obviated. The squirting device is now disconnected from the tapping pipe s and the cover d is replaced whereupon the squirting device is taken to the next pipe s to be used where the operations already described are repeated. As the distributing pipe system is thus secured against water hammers or sudden excessive water pressures comparatively light and cheap pipes can be used. The omission of numerous valves that can be operated at a high pressure also results in a great saving in the costs of the plant.

I claim:

The herein described irrigation apparatus comprising, in combination, means for supplying liquid continuously under comparatively high pressure, a main conduit leading from said supply means, a valve in said conduit, a plurality of valveless branch conduits of much lighter construction than said main conduit, each connected thereto at one end, closed at its other end, and having a multiplicity of spaced apart discharge openings in its upper wall, and a removable closure means for each such discharge opening adapted to be applied only when the main supply pressure is cut off, whereby any production of a water hammer effect in said weaker branch conduits is avoided because the flow of liquid while in motion through the system can be stopped only by the one valve near the source of supply.

In testimony whereof I have affixed my signature.

ALPHONS HORTEN.